United States Patent
Spears et al.

(10) Patent No.: US 7,102,679 B1
(45) Date of Patent: Sep. 5, 2006

(54) PHOTOSENSOR ARRAY USING MULTIPLE EXPOSURES TO REDUCE THERMAL NOISE

(75) Inventors: Kurt Spears, Fort Collins, CO (US);
Edward S Beeman, Windsor, CO (US);
James C Albritton-McDonald, Bellvue, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 636 days.

(21) Appl. No.: 09/558,434

(22) Filed: Apr. 25, 2000

(51) Int. Cl.
*H04N 3/14* (2006.01)
*H04N 1/04* (2006.01)
*H01L 27/148* (2006.01)

(52) U.S. Cl. .................. 348/312; 358/474; 257/223
(58) Field of Classification Search ........... 348/312, 348/314, 317, 300, 303; 358/213, 213.19, 358/213.23, 213.26; 250/214 P, 214 R; 257/223, 229, 291
See application file for complete search history.

(56) References Cited

U.S. PATENT DOCUMENTS

| | | | |
|---|---|---|---|
| 4,573,078 A * | 2/1986 | Rentsch et al. ............. 348/317 |
| 4,644,405 A | 2/1987 | Roy et al. .................. 358/213 |
| 4,689,686 A * | 8/1987 | Hashimoto et al. ....... 348/230.1 |
| 4,750,041 A | 6/1988 | Vogel et al. |
| 4,841,369 A | 6/1989 | Nishizawa et al. .... 358/213.26 |
| 4,870,494 A | 9/1989 | Tabei .................... 358/213.19 |
| 5,272,535 A * | 12/1993 | Elabd ........................ 348/314 |
| 5,308,970 A * | 5/1994 | Pool ........................ 250/208.1 |
| 5,777,671 A | 7/1998 | Maki et al. ................. 348/312 |
| 5,896,172 A | 4/1999 | Korthout et al. |
| 6,351,284 B1 * | 2/2002 | Watanabe et al. ........... 348/312 |
| 6,891,146 B1 * | 5/2005 | Spears ..................... 250/214.1 |

FOREIGN PATENT DOCUMENTS

| JP | 10224808 | 8/1998 |
|---|---|---|
| JP | 10229521 | 8/1998 |

* cited by examiner

*Primary Examiner*—David Ometz
*Assistant Examiner*—Kelly Jerabek
(74) *Attorney, Agent, or Firm*—Augustus W. Winfield

(57) ABSTRACT

In an image scanner, multiple exposures are used for each scan line, and only part of the pixels for each scan line are used for each exposure. For example, with two exposures, half the pixels may be used for the first exposure, and half for the second exposure. For each exposure, half of the charges are shifted out rapidly and discarded, without waiting for the A/D conversion time. As a result, for each exposure, the time required to empty the charge shift register is greatly reduced, reducing the thermal noise for all pixels.

5 Claims, 2 Drawing Sheets

PHOTOSENSOR ARRAY USING MULTIPLE EXPOSURES TO REDUCE THERMAL NOISE

FIELD OF INVENTION

This invention relates generally to photosensor arrays used for optical image scanners and cameras and more specifically to line arrays commonly used for optical image scanners.

BACKGROUND OF THE INVENTION

Image scanners convert a visible image on a document or photograph, or an image in a transparent medium, into an electronic form suitable for copying, storing or processing by a computer. An image scanner may be a separate device or an image scanner may be a part of a copier, part of a facsimile machine, or part of a multipurpose device. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example a photographic positive slide, through an optics system, and then onto an array of photosensitive devices.

Photosensor arrays typically have thousands of individual photosensitive elements. Each photosensitive element, in conjunction with the scanner optics system, measures light intensity from an effective area on the document defining a picture element (pixel) on the image being scanned. Optical sampling rate is often expressed as pixels per inch (or mm) as measured on the document (or object, or transparency) being scanned.

Photosensor arrays for image scanners commonly have three or four rows of sensors, with each row receiving a different band of wavelengths of light, for example, red, green and blue. Each row may be filtered, or white light may be separated into different bands of wavelengths by a beam splitter.

Sensor arrays are typically exposed for a fixed amount of time, and electric charges for each sensor element are transferred to one or more charge shift registers. The charges are then serially shifted bucket-brigade style in the charge shift registers to amplifiers and analog-to-digital (A/D) converters.

Bit depth is the number of bits captured per pixel. Typically, a pixel is specified in a three-dimensional color space with a fixed number of bits in each dimension. For example, a pixel may be specified in red, green, blue (RGB) color space, with 8 bits of red information, 8 bits of green information, and 8 bits of blue information, for a total of 24 bits per pixel. Alternatively, a pixel may be specified in a cylindrical color space in which the dimensions are luminance, chrominance, and saturation. Alternatively, a three-dimensional CIE color space may be used, for example, CIELAB or CIELUV, where one dimension is luminance.

During exposure to light, the primary noise source (called shot noise) is related to conversion of photons to electrons, and the noise increases with the square root of the signal. Even if a sensor is receiving no light, some thermal noise (called dark noise) may occur. Thermal noise (dark noise) increases with time, temperature, and photosensor area.

The sensitivity of the human visual system to light intensity is approximately logarithmic. That is, the human visual system is very sensitive to intensity changes in dark areas and shadow areas and the sensitivity to intensity change decreases with increasing intensity. Therefore, for a fixed level of noise, the noise is visually more apparent in the dark areas of an image. Photosensor signals are smaller for dark areas of an image, so that the signal-to-noise ratio becomes a particular concern for the dark areas of an image. Areas of an image with slowly varying color, particularly dark colors, require accurate lower order bits of bit depth, and high signal-to-noise, to accurately reproduce the smooth tone and texture of the original. Accordingly, because of the sensitivity of the human visual system in dark areas, and because of the signal-to-noise ratio in dark areas, and because of the need for accurate lower order bits in areas with slowly varying color, there is a need to reduce thermal noise.

Typically, for each generation of products, optical sampling rate increases, requiring smaller sensor sizes. Increased sampling rate also results in the sensors gathering less light, so that if a specified signal-to-noise ratio is required, then other changes may need to be made, such as increasing the light intensity, making the lens in the optical system larger, or increasing exposure times, each of which affects cost or performance. There is a need for a scanner that provides accurate lower order bits in bit depth, and high signal-to-noise, with a high optical sampling rate, with minimal impact on cost and performance.

SUMMARY OF THE INVENTION

Signal charges are subject to thermal noise as charges are being shifted in the charge shift register(s). In the example embodiments, the total time that charges reside in the charge shift register is reduced, to reduce the effects of thermal noise in the charge shift registers. Multiple exposures are used for each scan line, and only part of the pixels for each scan line are used for each exposure. For example, with two exposures, half the pixels may be used for the first exposure, and half for the second exposure. For the first exposure, the second half of the charges are shifted out rapidly and discarded, without waiting for the A/D conversion time. For the second exposure, the first half of the charges are shifted out rapidly and discarded, without waiting for the A/D conversion time. As a result, for each exposure, the amount of time that the shift register cells are exposed to thermal noise is reduced.

DETAILED DESCRIPTION OF THE PREFERRED EMBODIMENT OF THE INVENTION

Figure 1:
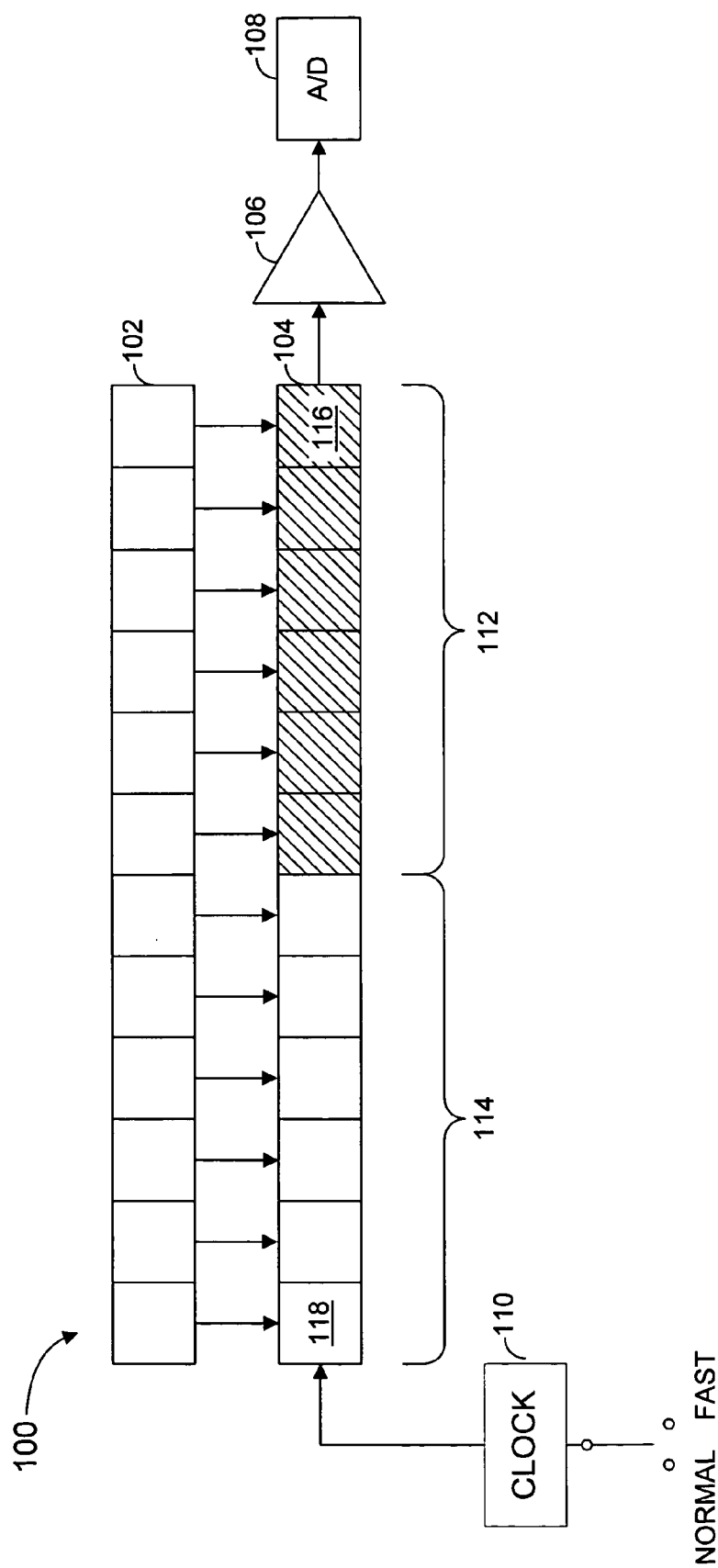
FIG. 1 is a block diagram of a sensor array system in accordance with the invention.

FIG. 1 illustrates an example of a photosensor array 100 suitable for use with the invention. The general arrangement illustrated in FIG. 1 is typical for a one-dimensional CCD array. However, the invention is equally applicable to CMOS sensors, Contact Imaging Sensors (CIS), solar cells, or any other photosensor array technology that involves serial shifting of electric charges before A/D conversion. In the example illustrated in FIG. 1, there is a single row of photosensors 102, a single charge shift register 104, an amplifier 106 that receives charges from the charge shift register 104, and an Analog-to-Digital (A/D) converter 108. The array in FIG. 1 has a single charge shift register 104 to facilitate illustration. However, it is also common to provide two charge shift registers, and to stagger the connections between the photosensors and the two charge shift registers, so that the first photosensor transfers charge to a first charge shift register, the second photosensor transfers charge to a second charge shift register, and so forth. With two charge shift registers, each shift register may have its own amplifier and A/D converter, or the registers may share a single amplifier and a single A/D converter.

One fundamental problem being addressed by the invention is that, with all other conditions being equal, thermal noise, for all stages of the charge shift register, increases with the total time required to remove all charges from the charge shift register. For example, in FIG. 1, when the charge from stage 118 is shifted one stage to the right, stage 118 is left empty (null signal). As the charge that originated in stage 118 is shifted further to the right, a null signal is being shifted right behind, and the null signal is accumulating thermal noise. Eventually, the charge that originated in stage 118 is shifted out of stage 116, and into the amplifier 106, leaving stage 116 with a residual charge comprising thermal noise accumulated and shifted for the entire time required to empty the register 104. The next time that signal charges are transferred from the sensors 102 to the charge shift register 104, the signal charges are added to the residual noise charges left over from the previous exposure. The example embodiment reduces the time required to empty the register 104, thereby reducing the thermal noise for all the residual charges in the register 104, thereby improving the signal-to-noise ratio for all the digitized intensity values subsequent to a first exposure.

The charge shift registers are logically divided into multiple sections. For example, in FIG. 1, charge shift register 104 is logically divided into two halves (112 and 114). The choice of halves is for illustration only, and the logical division could be thirds, quarters, etc. In addition, the sections do not have to be the same size. A shift clock 110 has at least a normal speed and a fast speed. For a first exposure, the first section (112) of the charge shift register is shifted to the amplifier 106 at normal speed, and all the charges in the second section (114) are shifted out at fast speed. No A/D conversion is performed for the charges that are shifted at fast speed. That is the charges in the second section of the shift register are simply dumped. Alternatively, some photosensor arrays have an ability to discharge all shift register stages simultaneously. If the photosensor array has a discharge capability, the shift register stages may be simply discharged after the first half has been shifted out to the amplifier.

The row of photosensors 102 is then exposed to light a second time. For the second exposure, the charges in the first section (112) of the shift register are shifted out at fast speed, without A/D conversion, and then the charges in the second section (114) are shifted out at normal speed with A/D conversion.

Consider a specific example. Assume that the row of photosensors has 20,000 photosensors. The normal clock speed is 2 million shifts per second into the amplifier. The fast clock speed is 16 million shifts per second into the amplifier. If the system had only one exposure per scan line, and only a normal shift speed, the residual charges in the charge shift register would be exposed to thermal noise for 10 milliseconds. With two exposures per scan line and a fast shift speed, in accordance with the invention, the charges from 10,000 photosensors are shifted at 16 million shifts per second, so that only 0.63 milliseconds are required to dump 10,000 charges, and then an additional 5 milliseconds are required for the signal charges of interest to reach the amplifier at normal shift speed, for a total of 5.63 milliseconds instead of 10 milliseconds. Therefore, the time available for dark noise received during shifting is reduced by about one-half. By dividing the registers into even smaller portions, for example, dividing the registers in thirds and exposing three times, the time spent in shifting may be reduced even further.

Scanners typically provide relative motion between a scanning head (which includes a light source, optics, and the photosensor array) and a document or other image being scanned. For multiple exposures as discussed above, one may choose to stop the relative motion until all exposures for one scan line are complete. Alternatively, continuous relative motion speed may be made slower to accommodate multiple exposures for each scan line, each exposure slightly displaced relative to the previous exposure.

Note that in the example, the total shift time for two exposures is about 11.2 milliseconds, compared to 10 milliseconds for the single exposure case, so each scan line takes about 12% more time. However, improving signal-to-noise by increasing exposure times may require even more time, and increasing intensity or increasing the size of a lens may be more expensive than providing faster shift speeds.

Figure 2:
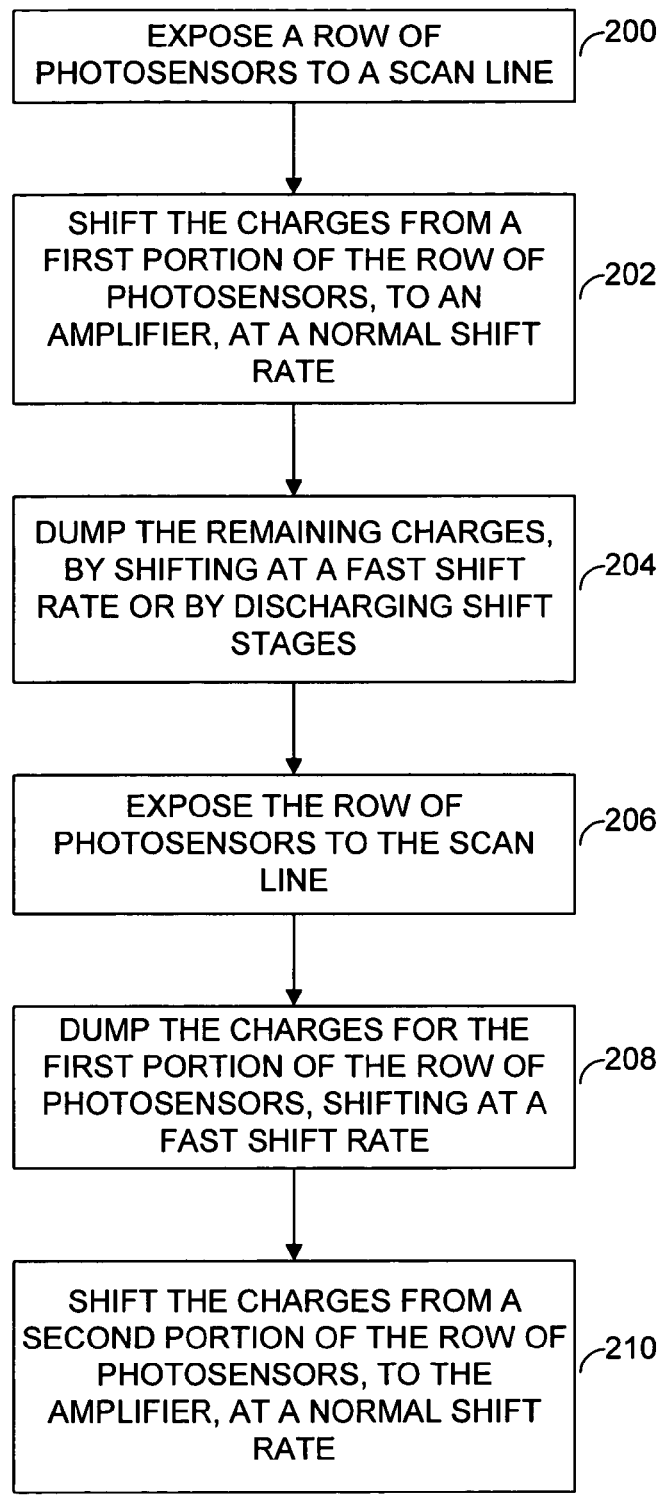
FIG. 2 is a flow chart of a method in accordance with the invention.

FIG. 2 illustrates a method in accordance with the invention. At step 200, the row of photosensors is exposed for a first time. At step 202, a first portion (for example, one-half, one-third, etc.) is shifted at a normal rate. At step 204, the remaining charges are dumped, either by shifting at a fast rate, or by simultaneously discharging the appropriate shift stages. At step 206, the row of photosensors is exposed for a second time. At step 208, the first portion of the charges are shifted at a fast rate with no A/D conversion, bringing the second portion of the charges into the first portion of the charge shift register. At step 210, a second portion of the charges are shifted at a normal rate. If appropriate, the process may be repeated for additional portions.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for scanning comprising:
   exposing an array of photosensors to light from an image;
   shifting a first portion of charges from the array of photosensors to an amplifier;
   dumping a second portion of the charges;
   exposing the array of photosensors to light from the image again;
   dumping the first portion of charges from the array of photosensors; and
   shifting the second portion of charges from the array of photosensors to the amplifier.

2. The method of claim 1, the steps of dumping further comprising:
   shifting charges from the array of photosensors at a shift rate that is higher than a normal shift rate.

3. The method of claim 1, the steps of dumping further comprising:
   discharging, simultaneously, a portion of charges from the array of photosensors.

4. The method of claim 1, wherein there is no relative movement between the array of photosensors and the image between the steps of exposing.

5. The method of claim 1, wherein there is relative movement between the array of photosensors and the image between the steps of exposing.

* * * * *